United States Patent [19]

Schmid

[11] 4,329,111

[45] May 11, 1982

[54] MECHANICAL MANIPULATOR

[75] Inventor: Peter Schmid, Evilard, Switzerland

[73] Assignee: Societe Suisse pour l'Industrie Horlogere Management Services, Biel, Switzerland

[21] Appl. No.: 160,258

[22] Filed: Jun. 17, 1980

[30] Foreign Application Priority Data

Jun. 19, 1979 [CH] Switzerland ............... 5729/79

[51] Int. Cl.³ .................................................. B25J 3/00
[52] U.S. Cl. ..................................... 414/733; 414/738; 414/917
[58] Field of Search ................. 414/917, 730, 733, 738

[56] References Cited

U.S. PATENT DOCUMENTS 3,703,968 11/1972 Uhrich ................................ 414/738
3,850,307 11/1974 Motoda ............................ 414/917 X

*Primary Examiner*—Richard A. Schacher

[57] ABSTRACT

First second and third drive units for a mechanical manipulator are located on a support. An articulated arm assembly extends from the support and includes a first member pivotally connected to a first pivot axis on the support to form part of a first lever-parallelogram having a first lever and also part of a third lever-parallelogram having a second lever. A second member is pivotally connected at a second pivot axis to the first member and forms part of a second lever-parallelogram. A third member is pivotally connected at a third pivot axis to the second member and also forms part of the second lever-parallelogram. The drive units are operative to drive the first member and the first and second levers so that rotation of the first and second levers through first and second angles produces rotation through the same first and second angles by the second and third members.

12 Claims, 7 Drawing Figures

MECHANICAL MANIPULATOR

This invention relates to a mechanical manipulator of the type described, for example, in U.S. Pat. No. 3,703,968.

One of the problems with many prior art manipulators is that the operating elements such as a gripper or tool thereof are not capable of independent motion with respect to the manipulator's remaining members. An advantage of a preferred embodiment of the invention about to be described, however, is that it permits the operating means to be independently moved.

Existing manipulators have had driving units thereof located on the articulated arms or levers themselves so that the arms carry the weight of the driving means. When employed in connection with industrial robots, however, such structures have a tendency to flex and vibrate so that the gripper, tool, or other operating means is not capable of being positioned with the desired precision. It is an object of this invention, therefore, to provide a mechanical manipulator that is more capable of precision positioning.

An advantage of the structure of preferred embodiments of the invention is that high positioning velocities are obtainable and objectional vibrations are reduced by a reduction in the mass of the structure's elements that are required to undergo relatively high accelerations.

Another disadvantage of prior-art manipulators is that they have relatively complicated movements which are difficult to program for motion of the gripper or tool to desired predetermined positions. In this regard, another advantage of the structure about to be described is that it is easily programmed to rapidly and accurately position the operating tool for performance of its desired function.

Many prior art manipulating devices have not been satisfactory for use in industrial robots. That is, they have tended to be large, cumbersome structures that have been manually controlled by hydraulic means where a human operator watches the motion of the gripper and makes necessary corrections to control its path to a predetermined position. Such devices, however, are not entirely satisfactory for use as industrial robots—particularly where human operators are not involved in their operation. The device of the invention, however, is particularly suited for use as an industrial robot.

A preferred embodiment of the invention about to be described employs pinion-driven gear segments which selectively initiate motion of the various elements of the robot's articulated arm. In this connection, another advantage of a preferred embodiment is that the gear segments are adapted to provide rotary power transmission in either direction without backlash.

In accordance with principles of the invention an industrial robot has first, second and third drive motors located on a support structure. An articulated arm assembly extends from the support structure and includes a first member that is pivotally connected to the support and forms part of both a first and a third lever-parallelogram. In this respect, the first lever-parallelogram has a first lever and the third lever-parallelogram has a second lever which are both pivoted about the same pivot axis as the first member. A second member is pivotally connected at a second pivot axis to the first member and forms a part of a second lever-parallelogram; and, a third member is pivotally connected at a third pivot axis to the second member and also forms a part of the second lever-parallelogram.

In operation, the first drive means pivots the first lever; the second drive means pivots the second lever; and, the third drive means pivots the first lever so that rotation of the first and second levers through first and second angles produces rotation by the second and third members through the same first and second angles. Because of these simple motions, the motion of the gripper or tool is easily programmed; and, because the lever system is not loaded by the mass of the drive units, it can be conveniently designed to have little weight so as to have high-speed, accurate positioning with little undesirable flexure of vibration.

A further simplification of the abovedescribed structure is obtained by providing that the first and second lever-parallelogram have a common member.

A still further advantage of an embodiment of the invention is that, in addition to at least one of the lever-parallelograms, an auxilliary lever-parallelogram is provided that is off-set from another lever-parallelogram. This increases the field of operation of the manipulating device because it reduces the chances of encountering a "dead point" that might otherwise occur in a lever-parallelogram. Each such auxilliary lever-parallelogram has one or two of the articulated arm's members and one or two of the levers of the respective parallelograms in common. If an auxilliary lever-parallelogram is provided for the first and second lever-parallelogram, for example, they may have a common lever. The common lever of the lever-parallelograms is advantageously also the common lever of the auxilliary lever-parallelograms. In this way the need for further parts is reduced and the mass of the articulated arm is also kept small.

In the illustrated embodiment about to be described each drive unit includes a pinion that engages one of the gear segments that is connected to the first member, or the first and second levers. Each of the gear segments includes a second gear segment that is spring-biased so as to be movable relative to the first gear segment and provide power transmission in both directions of rotation without appreciable backlash. In this respect, the drive means in the illustrated embodiment are comprised of digitally controlled stepping motors—as is a fourth drive unit that is connected to the support to provide rotary motion thereof in predetermined increments.

Each of the articulated arm's main members is comprised of two parallel parts which are separated from each other by a connecting web. In this manner, the articulated arm is highly stable without unduly increasing the structure's weight.

BRIEF DESCRIPTION OF THE DRAWINGS

The foregoing and other objects, features, and advantages of this invention will be apparent from the more particular description of a preferred embodiments thereof as illustrated in the accompanying drawings wherein the same reference numerals refer to the same elements throughout the various views. The drawings are not necessarily intended to be to scale, but rather are presented so as to illustrate principles of the invention in clear form.

In the drawings.

DETAILED DESCRIPTION

Figure 6:
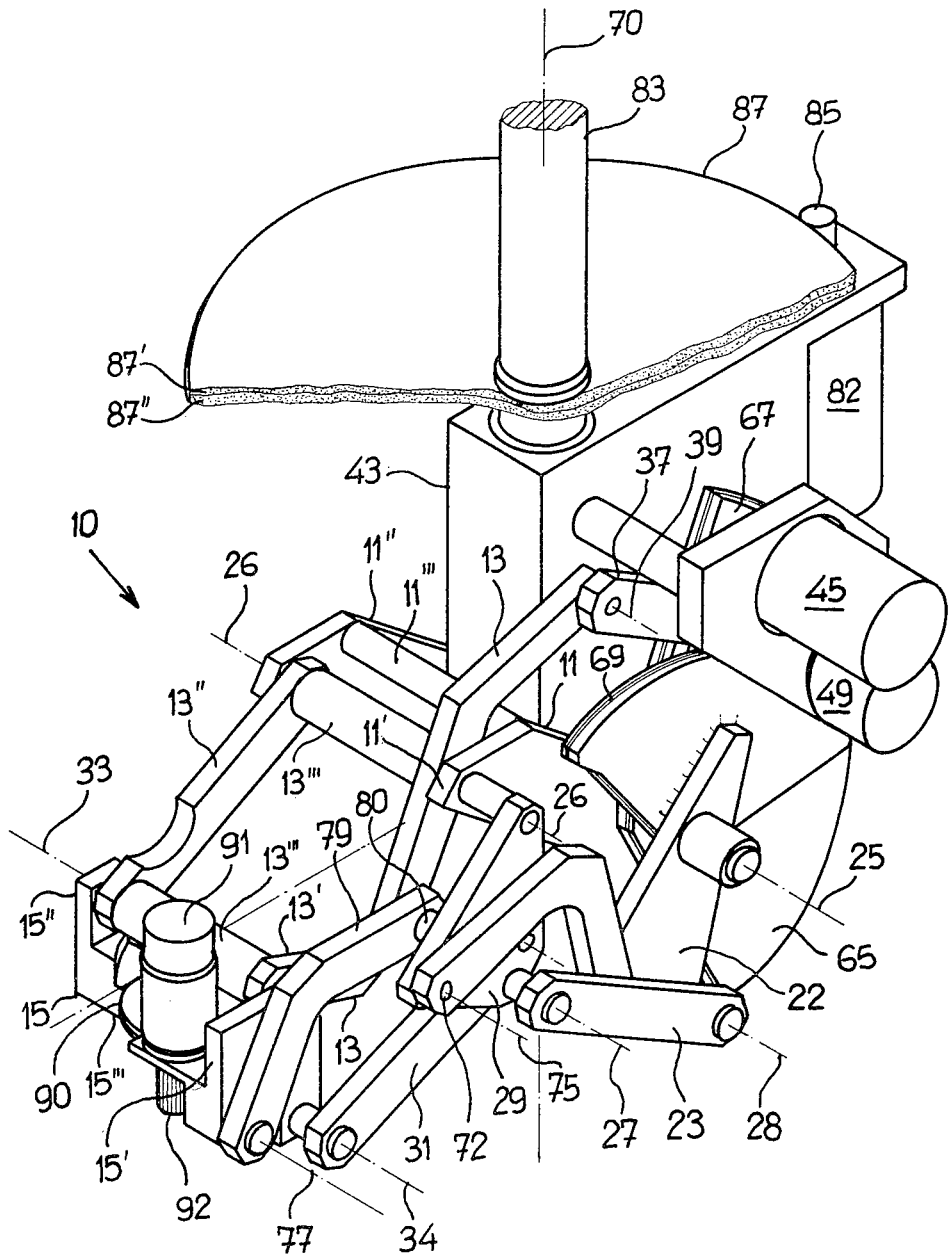
FIG. 6 is a perspective view of a manipulating device according an embodiment of the invention.
Figure 7:
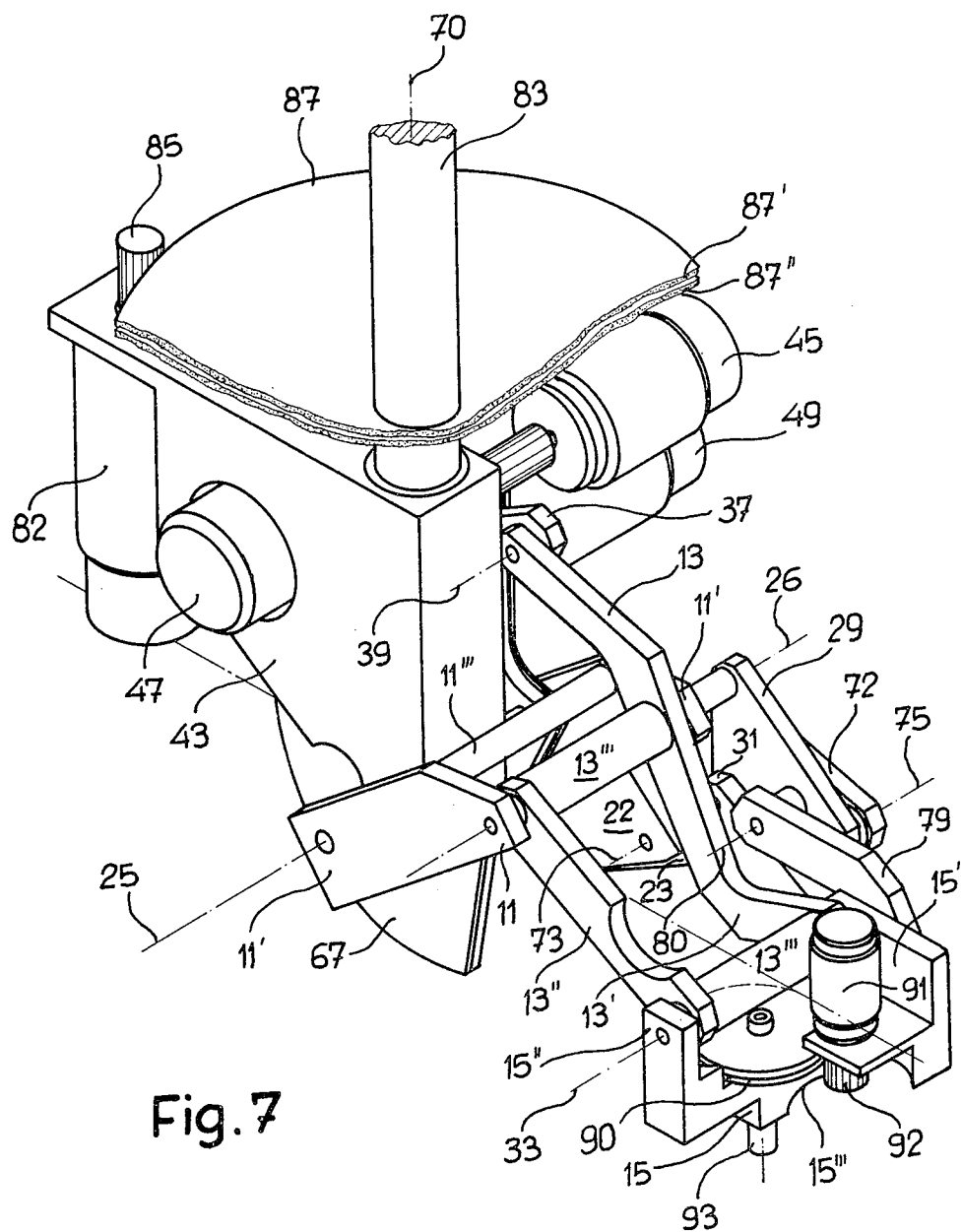
FIG. 7 is another perspective view of the manipulating device of FIG. 6, but seen from the opposite side.

FIGS. 6 and 7 illustrate an embodiment of an industrial robot according to the invention. Prior to describing those figures in more detail, however, the schematic illustrations will be discussed in order to more easily set forth structural fundamentals of the FIG. 6 and 7 embodiments.

Figure 1:
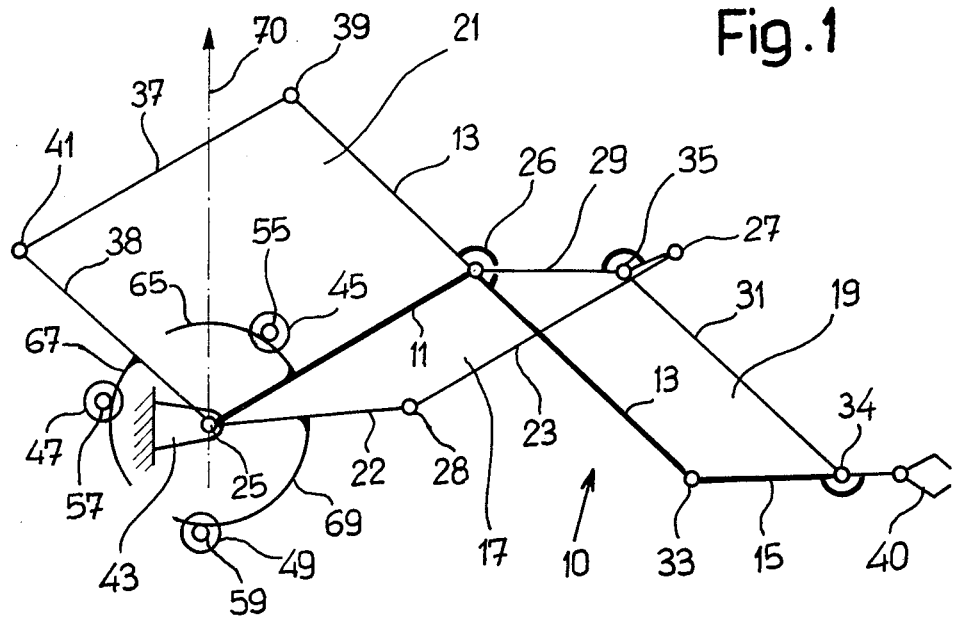
FIG. 1 is a schematic representation of a manipulating device having a three-member arm and a gripper.

FIG. 1 schematically illustrates a manipulating device comprising an arm assembly 10 having a first member 11; a second member comprising part of a longer lever 13; and, a third member 15. These three members (11, 13, and 15) are illustrated in heavy lines to distinguish them from the other levers and elements of the arm assembly 10.

The above-described members 11, 13, and 15 also form parts of three lever-parallelograms 17, 19, and 21. The first lever-parallelogram 17 comprises the member 11; the levers 22, 23, and 29; and, the pivot axes 25 through 28. The second lever-parallelogram 19 comprises the members 13 and 15; the levers 29 and 31; and, the pivot axes 26, and 33 to 35. In this respect, it can be seen that the first and second lever-parallelograms 17 and 19 have a lever 29 in common.

The third lever-parallelogram 21 comprises the member 11; an extension of the above-described member 13; and, levers 37 and 38. The third lever-parallelogram 21 has the lever 11 in common with the first parallelogram and the lever 13 in common with the second parallelogram. The third lever-parallelogram 21 further includes the pivot axes 25, 26, 39, and 41.

At the end of the arm assembly 10 is an operating element such as a gripper 40 which is of conventional design and, therefore, will not be further described. In lieu of the gripper 40 the operating element can be some other suitable type of tool.

It should be noted that the member 11 and the levers 22 and 38 have the same pivot axis 25 on a support 43. Drive units 45, 47, and 49 are also located on the support 43 (see also FIGS. 6 and 7). These drive units 45, 47, and 49 drive gear segments 65, 67, and 69 by pinions 55, 57, and 59. Accordingly, the weight of the drive units is concentrated at the support 43. Hence, they do not adversely load the arm assembly 10.

Means (not shown) may be provided to rotate the support 43 about a vertical axis illustrated by an arrow 70 in the figures.

Referring again to FIGS. 6 and 7, it should be noted that the main members 11, 13, and 15 each comprise two arms or portions designated, for example, in FIGS. 6 and 7 as 11', 11''; 13', 13''; and, 15', 15''. These arms are spaced from each other and connected by corresponding web portions 11''', 13''', and 15'''. Therefore, the members of the arm 10 have a light structure but are well supported on the pivot axes 25, 26, and 33 so that the arm assembly 10 has a high torsional stability. It should be understood, therefore, that a preferred embodiment of the invention includes double-members 11, 13, and 15, but the operation of the manipulator will now be described in connection with the schematic illustrations which, for purposes of simplicity, show only single members. In this respect, the various members that are operated by the drive units 45, 47, and 49 may be operated either individually or synchronously by selective operation of the drive units in accordance with robot's requirements at any given time.

Figure 2:
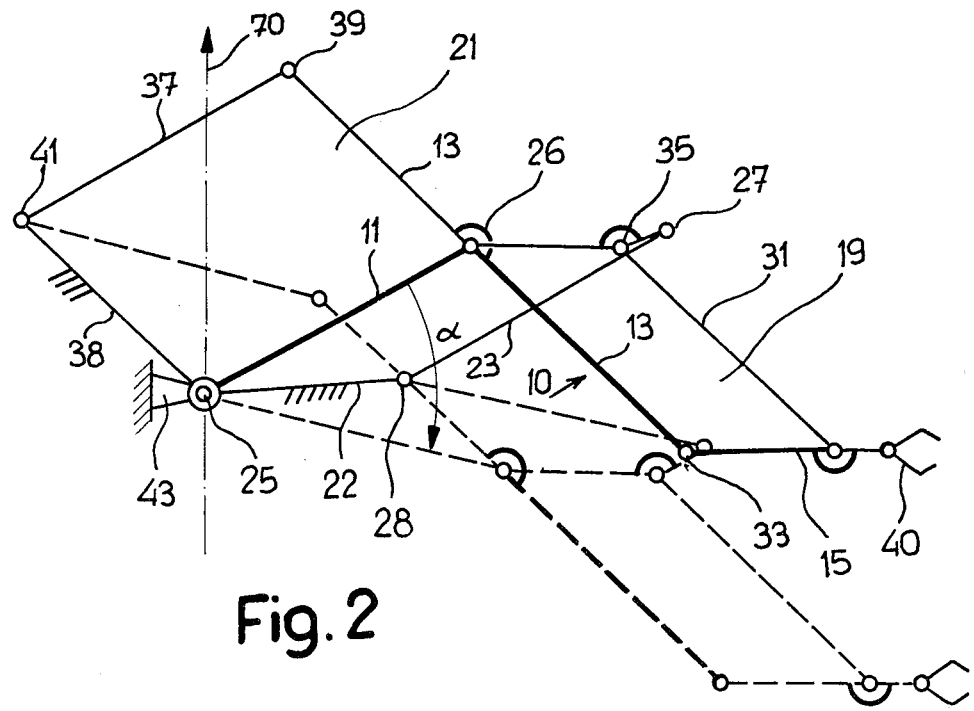
FIG. 2 is another schematic representation showing motion of the first member pivoted to the support.
Figure 3:
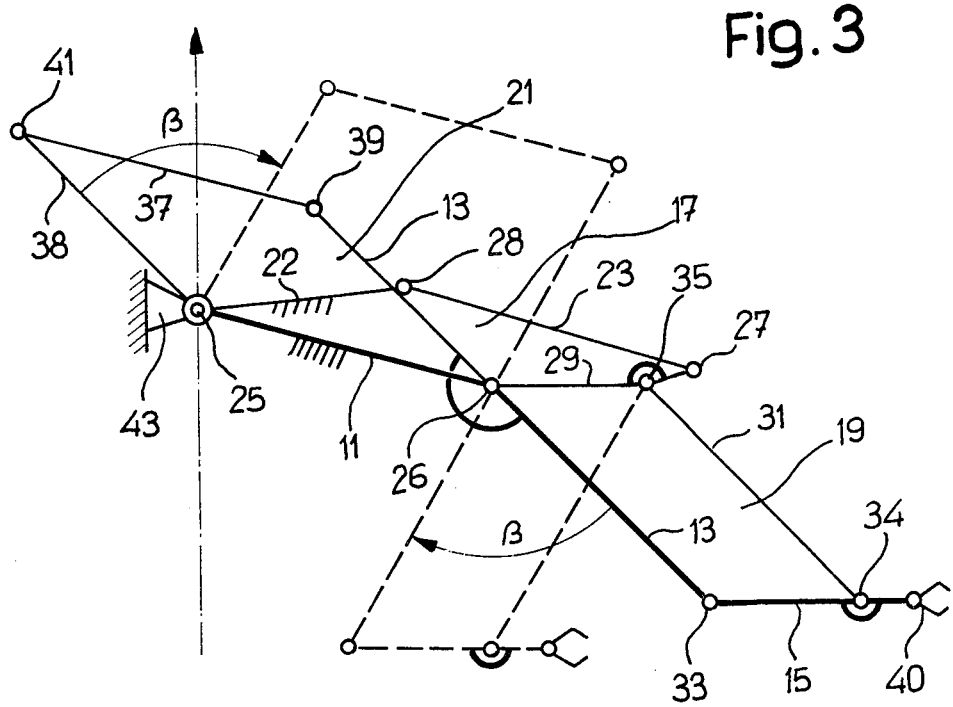
FIG. 3 is another schematic representation illustrating motion of the second member.
Figure 4:
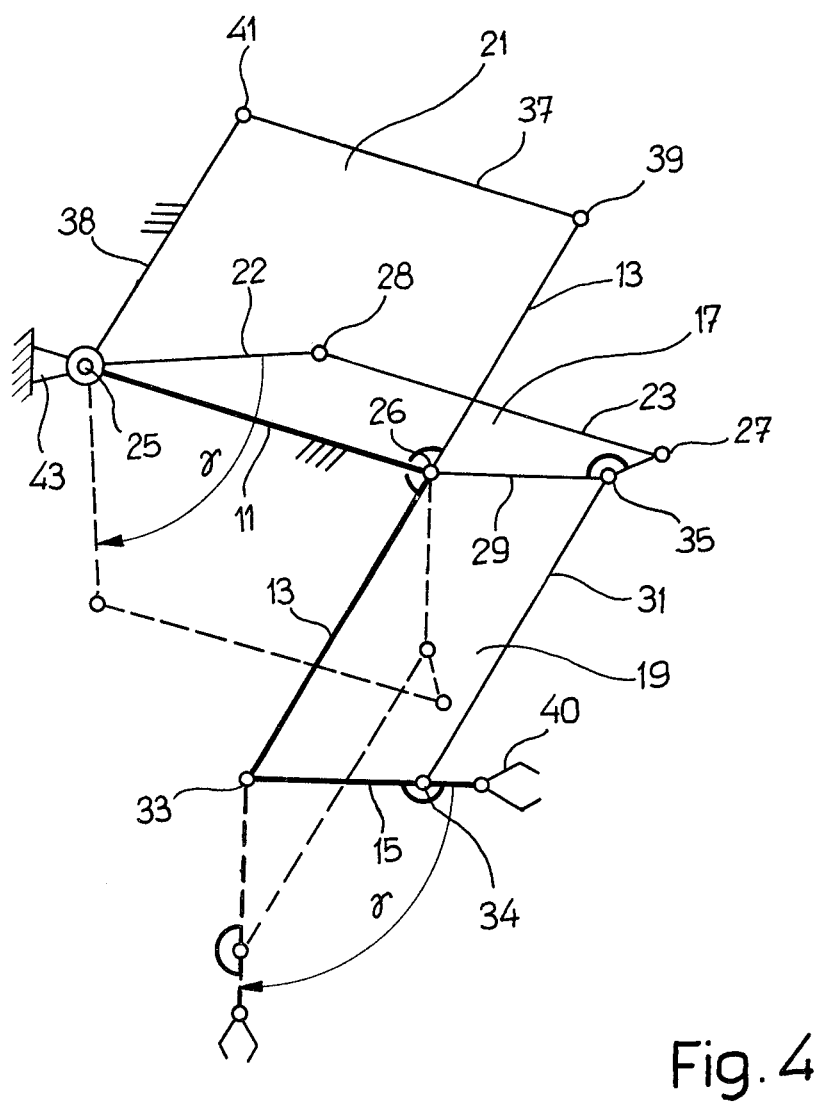
FIG. 4 is another schematic representation illustrating motion of the third member.

To further simplify an understanding of the operation of the manipulator, FIGS. 2 through 4 illustrate individual motions of the members 11, 13, and 15 as they are caused by the driving units 45, 47, and 49 operating upon member 11, and levers 13 and 22, respectively. In each case, it is assumed that two levers or members remain fixed. In FIG. 2, for example, the levers 22 and 38 remain fixed while member 11 is moved. In FIG. 3 the member 11 and the lever 22 remain fixed while the lever 38 is moved; and, in FIG. 4 the lever 38 and the member 11 remain fixed while lever 22 is moved.

As illustrated in FIG. 2, rotation of the member 11 through an angle $\alpha$ permits downward motion of member 15 to a parallel position illustrated by dashed lines. Similarly, motion of lever 38 through an angle $\beta$, as illustrated in FIG. 3, permits member 15 to move to the left, but still remain parallel to its position illustrated by solid lines. As lever 38 moves through its angle $\beta$ however, member 13 pivots about its pivot axis 16 through the same angle $\beta$ as for lever 38. Finally, from FIG. 4, it can be seen that rotation of lever 22 through an angle $\gamma$ causes member 15 to rotate through the same angle $\gamma$ about its pivot axis 33. In the above regard, all of the angular motions $\alpha$, $\beta$, and $\gamma$ are mathematically simple to analyze and, therefore, can be easily programmed.

In some instances where extensive motion is required, some of the lever-parallelograms pass through "dead points" as they undergo motion. For this reason, levers such as 72 and 79 can be added to the structure as illustrated in FIGS. 6 and 7 to accommodate situations where extensive motion is required.

Figure 5:
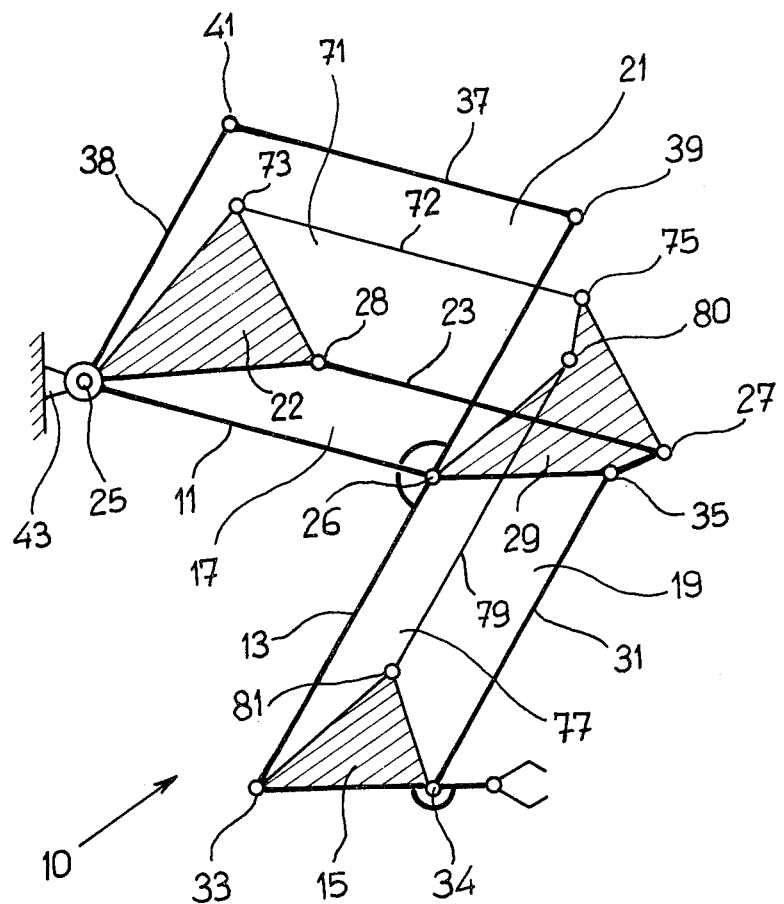
FIG. 5 is another schematic representation illustrating a manipulating device in an initial position of FIG. 4 with the addition of auxilliary lever-parallelograms.

The addition of links 72 and 79 are schematically illustrated in FIG. 5. As illustrated therein, two auxilliary lever-parallelograms 71 and 77 are formed thereby and are simply off-set from the lever-parallelograms described above. In this respect, the new parts 72 and 79 are shown in FIG. 5 to have been added to the structure essentially as it is positioned in the dashed lines of FIG. 3, but the new parts 72 and 79 are illustrated by thin lines in FIG. 5. The cross-hatched areas illustrate additional pivot axes which are added to the levers or other members previously described in connection with the structure schematically illustrated by FIG. 3. The lever 22, for example, has an additional pivot point 73; the lever 29 has additional pivot point 75 and 80; and, the member 15 has an additional pivot point 81.

The auxilliary parallelogram 71 corresponds to the first lever-parallelogram 17, but includes the additional lever 72 which is pivoted at 73 to lever 22 and at 75 to lever 29; and, runs parallel to member 11.

Similarly, the second auxilliary parallelogram 77 corresponds to the second lever-parallelogram 19, but comprises the additional lever 79. The lever 79 is pivoted to 81 to member 15 and at 80 to lever 29; and, runs parallel to member 13. As in the case of lever-parallelogram 17 and auxilliary parallelogram 71, therefore, the auxilliary parallelogram 77 is simply off-set from the lever-parallelogram 19.

Each auxilliary parallelogram also has one or two members of the arm assembly in common or one or two members of the lever-parallelogram in common. On both lever-parallelograms 17 and 19, for example, the lever 29 serves also as a common lever for the auxilliary lever-parallelograms 71 and 77. This arrangement, therefore, leads to a particularly simple construction and simple programming.

As noted above, FIGS. 6 and 7 show a practical embodiment of the manipulating device described in FIGS. 1 through 4 and also illustrates the auxilliary lever-parallelograms that are achematically depicted in FIG. 5. Inasmuch as the same reference numerals are used in FIGS. 6 and 7 as in the schematic illustrations, they will not be further described in connection with the robot's structure or operation except to discuss some additional details.

In the above regard, FIGS. 6 and 7 illustrate an additional drive unit 82 that is also mounted on the support 43. This drive unit is operative to rotatably or swivelably move the support 43 itself and the arm assembly 10 on a column 83. In this respect, as in the case of drive units 45, 47, and 49, the drive unit 82 may be a stepping motor wherein a pinion 85 of the drive unit 82 meshes with a gear or gear segment 87.

The gear segment 87 is comprised of first and second disks 87' and 87" which are biased (such as in counter rotational directions by a spring means not shown) so that the pinion 85 meshes with the teeth on the disks of the gear segment 87 without any play or backlash. The other gear segments 65, 67 and 69 are similar structured so that they too are free of backlash in their engagements with the pinions of their drive motors 45, 47, and 49. In this manner, the positioning accuracy of the arm assembly is substantially improved over prior-art devices.

Finally, the operating means such as gripper 40 is not illustrated in FIGS. 6 and 7. It can be connected, however, to the shaft 93 in FIG. 7 and rotated by gear 90 which is also comprised of biased, double disks to reduce backlash as described above. The gear 90 is, in turn, driven by pinion 92 affixed to drive unit 91 which is also a small, easily programmable stepping motor.

It will be appreciated by those skilled in the art that the above-described structure provides an easily programmed robot mechanism that is capable of high positioning velocities with little vibration or flexure. Moreover, the device is capable of an extensive range of motion without the need for manual control.

While the invention has been particularly shown and described with reference to preferred embodiments, it will be understood by those skilled in the art that various changes in form and detail may be made therein without departing from the spirit and scope of the invention. Additionally linkages can be added, for example, and dimensional relationships can easily be changed.

The embodiments of the invention in which an exclusive property or privilege is claimed are defined as follows:

1. A mechanical manipulator comprising in combination:
    a support;
    first, second and third drive means located on said support;
    an articulated arm assembly extending from said support, said arm assembly further comprising:
        a first member pivotally connected on a first pivot axis to said support and forming part of said first lever-parallelogram having a first lever and also forming part of a third lever-parallelogram having a second lever;
        a second member pivotally connected on a second pivot axis to said first member and forming part of a second lever-parallelogram;
        a third member pivotally connected on a third pivot axis to said second member and also forming a part of said second lever-parallelogram;
        said first drive means being operative to pivot said first member about said first pivot axis;
        said second drive means being operative to pivot said second lever of said third lever-parallelogram; and,
        said third driving means being operative to pivot said first lever of said first lever-parallelogram so that rotation of said first and second levers through first and second angles produces rotation through the same first and second angles by said second and third members.

2. The manipulator of claim 1 wherein said first member; said first lever of said first lever-parallelogram and said second lever of said third lever-parallelogram all pivot about said first pivot axis.

3. The manipulator of claim 1 or claim 2 including a third lever that is common to both said first and second lever-parallelograms.

4. A manipulator according to claim 1 including an auxilliary lever-parallelogram that is off-set to one of said first or second lever-parallelograms.

5. A manipulator according to claim 1 including an auxilliary-lever-parallelogram having a third lever that is common to at least one of said first and second lever-parallelograms.

6. A manipulator of claim 5 wherein said third lever is common to both of said first and second lever-parallelograms.

7. A manipulator of claim 1 including a gear segment affixed respectively to each of said first and second levers and said first member; and,
    a pinion on each of said drive means for engaging a one of the respective gear segments.

8. The manipulator of claim 7 including an auxilliary gear segment corresponding to at least one of said gear segments and spring-biased relative to said gear segment to provide backlash-free power transmission in either direction of rotation of said gear segment about an axis thereof.

9. A manipulator according to claim 1 wherein each of said first, second, and third members comprises first and second parallel portions thereof spaced apart from each other and connected to each other by a web means.

10. A manipulator of claim 1 including a fourth drive means for selectively rotating said support about an axis thereof.

11. A manipulator of claims 1 or 10 including means for digitally controlling at least one of said drive means.

12. The manipulator of claim 1 including an operating means located at said third member.

* * * * *